May 9, 1967 A. NEVULIS 3,318,326
RELIEF VALVE
Filed Jan. 28, 1965 3 Sheets-Sheet 1

INVENTOR.
ANTHONY NEVULIS
BY
Teare, Fetzer & Teare
ATTORNEYS

May 9, 1967

A. NEVULIS 3,318,326

RELIEF VALVE

Filed Jan. 28, 1965

INVENTOR.
ANTHONY NEVULIS
BY
*Teare, Fetzer & Teare*
ATTORNEYS

United States Patent Office 3,318,326
Patented May 9, 1967

3,318,326
RELIEF VALVE
Anthony Nevulis, Wickliffe, Ohio, assignor to The Ohio Brass Company, Mansfield, Ohio, a corporation of New Jersey
Filed Jan. 28, 1965, Ser. No. 428,729
13 Claims. (Cl. 137—491)

This invention relates in general to a valve mechanism for use in fluid systems, and more particularly to a novel pilot operated relief valve mechanism especially adapted for use in relatively high pressure systems (e.g. 1000 p.s.i. or more).

Relief valve mechanisms are known in the art for limiting the maximum fluid pressure able to be applied within a system or valve, and sometimes these relief valve mechanisms are adjustable to enable a selected range of maximum pressures to be provided for.

However, such known relief valve mechanisms have had some undesirable characteristics, and as for instance a too short wear life, due generally to the relatively high sealing force at the main seat of the valve; also such prior art relief valves have unduly limited the fluid flow therethrough for a particular size valve, with generally insufficient capacity being provided due to the inherent limitations of the flow through existing designs of the valve mechanisms. Also, the cracking pressure and the full flow pressure in such prior art valves generally leaves much to be desired, in that generally there is a considerable range between such pressures, unless the valve is manufactured to extremely close tolerances, which materially increases the cost of the valves.

The present invention provides a novel pilot operated relief valve that utilizes a main poppet adapted for exposure to system pressure and with the relief valve being effectively maintained in a closed or cut-off condition at a selected system pressure, but wherein the main poppet is placed in a stage of floating equilibrium at a relatively slightly greater system pressure, for causing rapid opening of the main poppet and highly effective regulation of the system pressure.

Accordingly, an object of the invention is to provide an improved pilot operated relief valve mechanism for fluid systems.

A further object of the invention is to provide a relief valve mechanism in which the cracking pressure and the full flow pressure through the valve are much closer together as compared to heretofore known arrangements, without necessitating critical machining in the manufacture of the valve mechanism.

A still further object of the invention is to provide a novel cartridge type relief valve mechanism including a main hollow poppet valve and a pilot poppet valve, with one end of the main poppet being adapted for exposure to system pressure and the interior of the poppet valve and said pilot valve being adapted for exposure to the system pressure by way of a metering device in the valve so that the main poppet is placed in a stage of floating equilibrium at a predetermined system pressure for rapid response thereof in regulation of the system pressure.

Another object of the invention is to provide a cartridge type relief valve mechanism of the latter type wherein the main poppet embodies compensating throttling means which operates to maintain a generally constant effective force on the poppet under conditions of widely varying flows through the relief valve.

Other objects and advantages of the invention will be apparent from the following description taken in conjunction with the accompanying drawings wherein.

Figure 1:
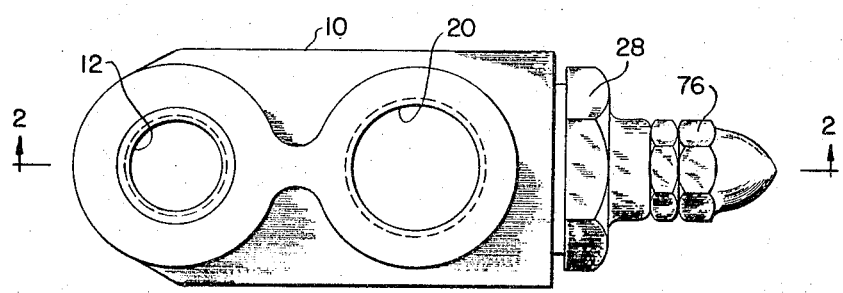
FIG. 1 is a top plan view of a relief valve embodying the invention.

Referring now again to the drawings, the relief valve of the invention may be disposed in a valve body or housing 10 having a high pressure exit port 12 for the egress of pressurized fluid, and a high pressure inlet port 14 for the ingress of pressurized fluid. The port 12 can be connected into a fluid system, and for instance directly to a distributing valve for control of the flow of pressurized actuating fluid to mechanisms, such as for instance fluid powered motor units. Port 14 may be connected by a conventional fluid transmission line to a conventional pump 15 which may be connected to a reservoir 15a in the conventional manner.

The valve body 10 may comprise a high pressure chamber or zone 16 intermediate ports 12 and 14, which is communicated by means of a passageway 16a to another chamber or low pressure zone 18 in the valve body. Such other chamber 18 may communicate with a port 20 which may be connected by fluid transmission line 22 to reservoir 15a in the fluid power system.

The relief valve mechanism of the invention may be in the form of the well known cartridge type, which is adapted to be mounted in the valve body 10 and as by means of threaded connection 26. The valve cartridge may comprise a unitary body 28, having a stem portion 30 projecting therefrom and adapted to extend through chamber 18, and into passageway 16a and chamber 16. Mounted on the stem for slidable axial movement with respect thereto and against the resistance to compression of spring 29, is a main poppet valve, which may comprise a cylindrical-like member 30a defining a cylindrical-like chamber 32 interiorly thereof. The sealing end of poppet 30a may be recessed inwardly as at 34 (FIG. 3) and then may be provided with a tapered sealing surface 36, which is adapted for sealing engagement with circumferential sealing edge 38 on seat member 40.

Seat member 40 may comprise a cylindrical-like shell having a plurality of circumferentially spaced openings 42 through the end wall 43 thereof, and is provided with circumferential sealing means 44 coacting between the seat member 40 and the confronting surface of passageway 16a, for sealing the seat member with respect to the passageway.

The stem portion 30 of the cartridge may be provided with a circumferential shoulder 45 adjacent its distal end, which coacts with end wall 43 of the seat member 40, for holding the stem coupled to seat 40, and in this connection the stem 30 may be provided with a resilient or yieldable split ring member 46, coacting in a slot in the end of the stem portion and overlapping the seat member.

It will be noted that the cylindrical wall portion of the seat member 40 is provided with a circumferentially recessed section 48 at one end, which defines a skirt 50 on the seat member, which overlaps the recessed portion 34 on the main poppet 30a, for a purpose hereinafter to be discussed in detail. Sealing means 52 on the main poppet 30a coacts with the associated cylindrical portion 53 of stem 30, for sealing the axially movable main poppet member with respect to the stem. Resilient sealing means 54 is also mounted in the enlarged portion 56 of the stem, for sealing such portion with the cylindrical wall of the main poppet member 30a as shown, and providing fluid balancing means within poppet 30a. The diameter of seating surface 38 is preferably slightly smaller than the diameter of stem portion 56 at sealing means 54. For instance, seating surface 38 may have a diameter of 0.730 inch, while stem portion 56 may have a diameter of 0.748 inch.

A metering orifice 57 is provided in the distal end of stem 30, which orifice opens into an axially extending passageway 58, which in turn opens into enlarged pilot valve chamber 60.

Disposed in metering orifice 57 is a metering pin or wire 61, maintained therein as by means of its crimped ends. Pin 61 meters system pressure into passageway 58 and via orifices 62, into chamber 32 in the main poppet. As an example, pin 61 may have a diameter of approximately 0.059 inch, while orifice 57 may have a diameter of approximately 0.062 inch.

A metering means or pilot poppet 63, which in the embodiment illustrated is of spherical configuration, is adapted to engage valve seat 64 at the juncture of chamber 60 and passageway 58, for sealing the passageway 58 from communication with chamber 60. A spring means 66 coacting between spherical valve 62 and a movable seat 68 in chamber 60, resiliently urges the valve member 63 into engagement with seat 64.

Figure 2:
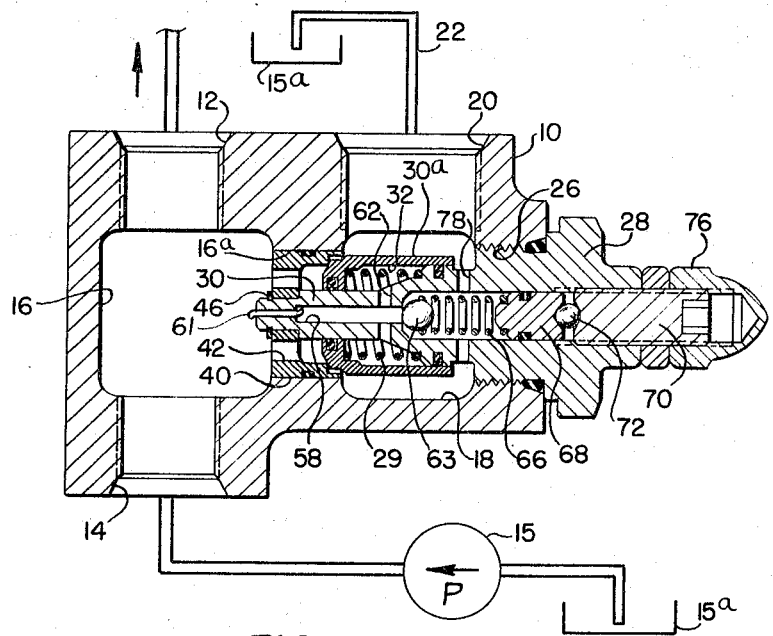
FIG. 2 is a sectional view taken generally along the plane of line 2—2 of FIG. 1, looking in the direction of the arrows, and showing the piloted operated relief valve coupled into a diagrammatically illustrated fluid system.

The pre-compression on spring member 66 may be varied by means of threaded member 70 coacting with seat member 68 via the spherical member 72, for adjusting the pre-compression in the spring 66. Sealing means 74 coacts between movable seat member 68 and the defining wall of chamber 60, for sealing the chamber from the egress of pressurized fluid, and a cap member 76 may be provided on the outer end of the cartridge for protecting the adjusting member 70. Apertures 78 extending through the wall of the enlarged portion 56 of the stem communicate chamber 60 with chamber 18 in the valve body 10, as best seen in FIG. 2.

Since the diameter at sealing surface 38 of the main poppet is less than the diameter of stem portion 56 in chamber 32, there is provided a positive fluid unbalance force supplementing the poppet spring 29, and providing positive sealing pressure on the poppet seat 40. Therefore for a condition of floating equilibrium of the main poppet 30a with respect to the poppet seat, and therefore a condition of poppet control modulation, the pressure within chamber 32 of the poppet must be sufficiently lowered to offset the area differential and the poppet spring 29 preload.

Assuming for purposes of discussion that the pilot valve 63 is set to open at approximately 1800 p.s.i. and that the relief valve is adapted to maintain a system pressure of approximately 2000 p.s.i., until the system pressure reaches 1800 p.s.i., the main poppet 30a is maintained on its seat with a comparatively large force ensuring substantially no leakage.

Once the system pressure of 1800 p.s.i. is reached, the fluid passing through metering orifice 57 will unseat pilot valve 63. With the system pressure rising from 1800 p.s.i. to 2000 p.s.i. the main poppet will remain on its seat, with the flow through the pilot valve 63 proportionally increasing with the increasing pressure differential acting across the metering orifice 57. Once the 2000 p.s.i. system pressure is reached, the main poppet 30a reaches the stage of floating equilibrium, with the system pressure acting on the front area of the poppet 30a being balanced by the internal pressure in chamber 32 and the spring 29 preload. Any increase of system pressure beyond this 2000 p.s.i. point will automatically tend to increase the pressure within the poppet 30a—the poppet being a free floating body—this increasing the rate of fluid discharge through the pilot valve 63. The above increasing rate of fluid discharge through pilot valve 63 will automatically increase the pressure drop through the fluid restricting means or metering orifice 57, thus effectively reducing the pressure within the poppet 30a in respect to the higher level of the system pressure, and the main poppet 30a will move off its seat 40, thus regulating the system pressure.

Any drop in system pressure acting on the frontal area of the poppet 30a will automatically reflect itself in the pressure level within the poppet 30a. With reduced flow through the pilot valve 63 the corresponding reduction in the pressure drop through the metering orifice 57 will increase the pressure within the main poppet 30a in respect to system pressure. Under these conditions, the poppet 30a will tend to move toward its seat 40. A very sudden drop in system pressure, even of a comparatively small magnitude, will automatically seat the pilot valve 63, with the main poppet 30a advancing at a rapid rate, equivalent to the full metering orifice 57 flow, toward its seat 40.

Accordingly, in general, with the relief valve set to work at 2000 p.s.i. system pressure, effective sealing will occur with the poppet 30a sealing pressure gradually increasing up to 1800 p.s.i. Above, 1800 p.s.i. system pressure, and until 2000 p.s.i. system pressure is reached, the pilot valve 63 will start passing fluid, of relatively small magnitude, with the sealing seat contact pressure of poppet 30a gradually being reduced to zero. Above 2000 p.s.i., the relief valve operation will begin with the main poppet 30a opening rapidly to regulate system pressure, with the response of the poppet 30a proportional to the controlled system pressure level.

Figure 3:
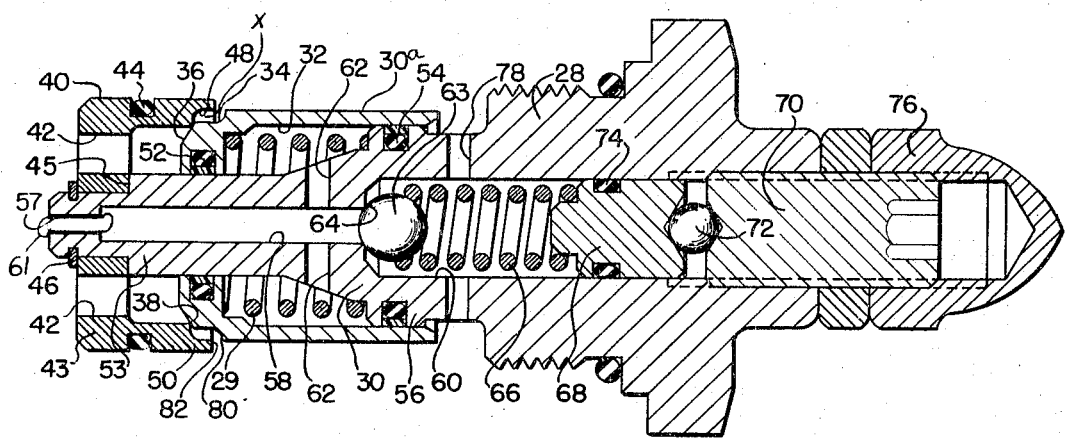
FIG. 3 is an enlarged, sectional view of the relief valve of the invention.
Figure 4:
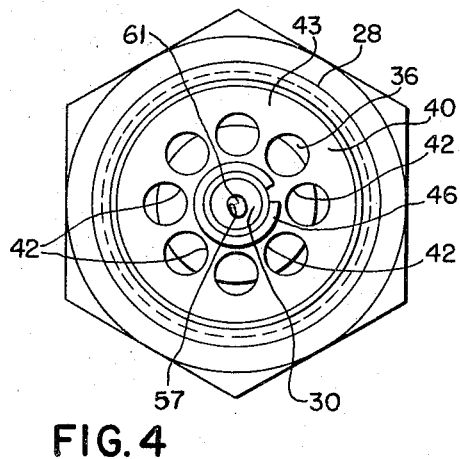
FIG. 4 is an end view taken from the left hand end of FIG. 3.

Referring particularly to FIG. 3 the aforementioned skirt section 50 of the main poppet seat 40 is extremely useful in the operation of the valve, in that it compensates for the change of static area exposed to the system pressure by dynamic flow characteristics, as the flow through the main poppet goes from zero to maximum as well as compensating for the very considerable pressure drop occurring across the openings 42 in the seat 40.

Skirt 50 provides a secondary zone X of throttling on the periphery of the main poppet 30a. Part of the frontal area of the main poppet 30a is positioned within this secondary throttling zone. At small flows, with small pressure drops through the openings 42 in the seat 40, and lower magnitudes of pressure disturbances on the frontal area of the poppet 30a, very low pressures in this secondary throttling zone are generated. With an increase rate of flow and therefore gradually decreasing force on the frontal poppet area, a proportionally increasing supplementing force is generated in the secondary throttling zone defined by skirt 50. In this way, irrespective of the flow level, a generally constant effective resultant force is maintained on the frontal area of the poppet. The skirt or compensator 50 shown in FIG. 3, utilizes a constant restriction, which is the spacing between the peripherial surface of the main poppet 30a and the confronting surface of the skirt 50, in series with a variable restriction which is the spacing between the shoulder 80 on the poppet and the end surface 82 on the seat, which of course increases as the poppet 30a moves axially away from the seat.

Figure 5:
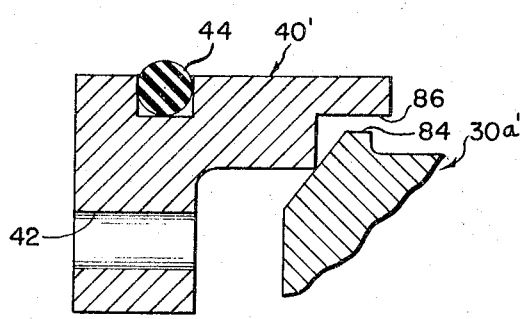
FIG. 5 is an enlarged, fragmentary, sectional view of a modified form of throttling means on the main poppet of the relief valve.

Referring to FIG. 5, there is shown a modified form of compensating device comprising a throttling compensator of constant restriction between axially extending surface 84 on the poppet 30a' and the confronting surface 86 on the seat 40'.

Figure 6:
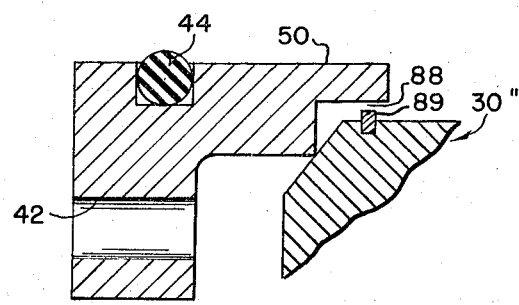
FIGS. 6, 7, 8 and 9 are enlarged, fragmentary, sectional views similar to FIG. 5, but illustrating further embodiments of throttling means on the main poppet.

FIG. 6 shows another embodiment similar in operation to that of FIG. 5, and consisting of a constant restriction 88, but wherein the poppet 30a'' is formed with a preferably removable annular member 89 disposed in a complementary slot which member forms the constant restriction in conjunction with the confronting surface of the skirt 50. Member 89 may be of a split-ring like construction and may be replaced with various sizes of members, thus varying the size of the constant restriction 88.

Figure 7:
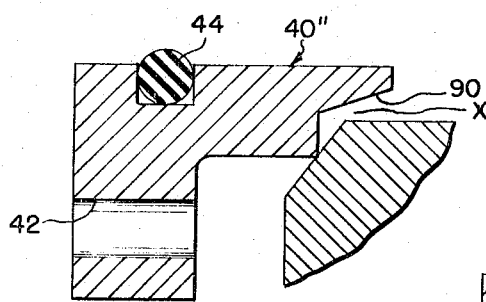

FIG. 7 shows a compensating device wherein the skirt on the seat 40'' has an outwardly sloping surface 90 which provides a variable restriction, with the throttling zone X increasing as the poppet moves away from its seat.

Figure 8:
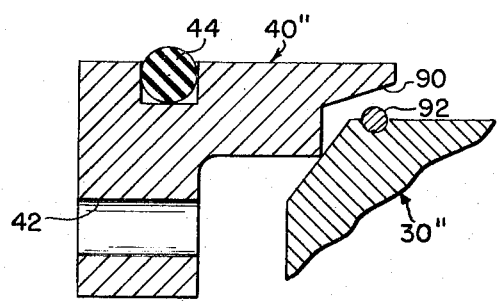

The embodiment illustrated in FIG. 8 is similar to that of FIG. 7 except that it has a replaceable restrictor 92 of preferably circular cross section coacting with surface 90.

Figure 9:
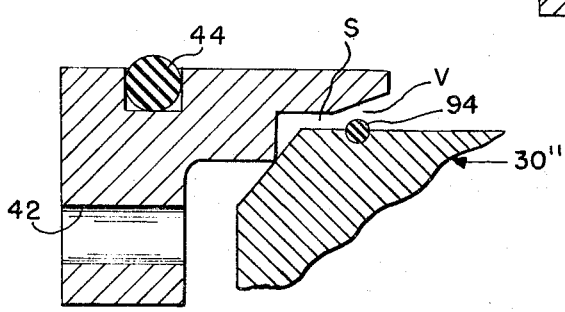

FIG. 9 shows a combination of compensating restrictions in series, with restriction S being constant, and the restriction V being variable and defined in part by separate member 94 on the poppet.

From the foregoing discussion and accompanying drawings, it will be seen that the invention provides a novel pilot operated relief valve mechanism for improving the flow characteristics therethrough and one that provides a longer service life for the valve and a valve wherein the cracking pressure and the full flow pressure are much closer together without introducing critical machining problems in the production of the valve.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. A relief valve for use in a fluid system comprising, a body having a cylindrical-like stem projecting outwardly therefrom, a hollow cylindrical main poppet member mounted for axial movement on said stem, said stem including a larger cylindrical portion adjacent the juncture of the stem with the body and a smaller cylindrical portion adjacent the distal end of said stem, spaced sealing means coacting between said larger stem portion and the interior of said poppet member and between the latter and said smaller stem portion and sealing the interior of said poppet member against egress of fluid therefrom, a hollow cylindrical-like valve seat anchored to the distal end of said stem, said valve seat comprising, an end wall anchored to said stem and a generally axially extending side wall circumferentially encompassing said stem, said valve seat being adapted for engagement by said poppet member, said end wall having a plurality of apertures therethrough for exposing said poppet member to system pressure, resilient means disposed interiorly of said poppet member and urging the latter into sealing engagement with said seat, the sealing area at said seat being less than the sealing area at said larger stem portion for providing a fluid unbalancing force to supplement said resilient means, said valve seat having a circumferential skirt encompassing a portion of the axially extending exterior of said poppet member and providing a throttling section, fluid transmitting passageway means extending axially through said stem from said distal end, aperture means communicating said passageway means with the interior of said poppet member, metering means disposed in said passageway means for restricting the flow of pressurized fluid into the interior of said poppet member, said valve having a chamber therein spaced from said metering means and said aperture means, said chamber having an exit port, a pilot valve seat communicating said passageway means with said chamber, a pilot valve member disposed in said chamber, and including resilient means urging said pilot valve member into engagement with said pilot valve seat, said pilot valve member being adapted to open at a predetermined fluid pressure lower than a predetermined system pressure at which said main poppet is adapted to open, whereby said main poppet member is placed in a condition of floating equilibrium at said predetermined system pressure.

2. In a relief valve for use in a fluid system comprising, a body having a stem projecting outwardly therefrom, a hollow main poppet member mounted for axial movement on said stem, a valve seat adapted for engagement by said poppet member, means resiliently urging said poppet member into engagement with said valve seat, said poppet member being adapted for exposure to system pressure at said valve seat, means coacting between said poppet member and said stem and sealing the interior of said poppet member against egress of fluid therefrom, fluid transmitting means in said stem communicating said seat with the interior of said poppet member, metering means in said fluid transmitting means for restricting the flow of fluid therethrough to said interior, pilot valve means coacting with said fluid transmitting means for limiting fluid pressure in said interior and said fluid transmitting means, and means coacting between said stem and said valve seat and anchoring said valve seat in mounted condition on said stem.

3. A valve in accordance with claim 2, including throttling means on the exterior periphery of said poppet member and on said seat for maintaining a generally constant effective resultant force on said poppet member at said seat during actuation of the poppet member by system pressure away from said seat, said throttling means comprising a skirt portion on said seat encompassing in spaced relation said poppet member adjacent the engagement of said poppet member with said valve seat, said skirt portion comprising a symmetrically oblique surface diverging in the direction of opening movement of said poppet member, and a radially projecting portion on said poppet member disposed in confronting relation to said oblique surface.

4. A valve in accordance with claim 3, wherein said radially projecting portion is removably attached to said poppet member, and wherein said radially projecting portion is of a generally circular configuration in the transverse cross section.

5. In a relief valve for use in a fluid system comprising, a body having a stem projecting outwardly therefrom, a hollow main poppet member mounted for axial movement on said stem, a valve seat adapted for engagement by said poppet member, means resiliently urging said poppet member into engagement with said valve seat, said poppet member being adapted for exposure to system pressure at said valve seat, means coacting between said poppet member and said stem and sealing the interior of said poppet member against egress of fluid therefrom, fluid transmitting means in said stem communicating said seat with the interior of said poppet member, metering means in said fluid transmitting means for restricting the flow of fluid therethrough to said interior, and pilot valve means coacting with said fluid transmitting means for limiting fluid pressure in said interior and said fluid transmitting means, said metering means comprising a metering orifice having a metering pin therein for metering fluid through said orifice, and said pilot valve means comprising a spring loaded pilot valve.

6. A valve in accordance with claim 5, wherein the sealing area at said valve seat is less than the sealing area between said stem and the distal end of said poppet member for providing a fluid unbalancing force to supplement said resilient means prior to actuation of said pilot valve means.

7. A valve in accordance with claim 5, including a chamber in said body spaced from said metering means and communicating with said fluid transmitting means, said pilot valve means being disposed in said chamber and being adapted to close said chamber from communication with said fluid transmitting means, said chamber having an exit port, said pilot valve means including a poppet member and means resiliently urging said pilot poppet member in a direction to close said chamber from said fluid transmitting means.

8. In a relief valve mechanism for use in a valve housing of the type including a high pressure zone, a low pressure zone and a passageway connecting said zones, said mechanism comprising a body mounted in said housing so as to be in communication with said zones via said passageway, a valve seat disposed in said passageway intermediate the high and low pressure zones, a resiliently biased poppet member disposed in said low pressure zone adapted for sealing engagement with said valve seat, guide means adapted to provide axial movement of said poppet member with respect to said body and said valve seat, said valve seat including an end wall having a plurality of apertures therein for exposing the exterior of said poppet member to system pressure, said end wall having a circumferential skirt encompassing an axially extending exterior portion of said poppet member and providing a throttling section therewith, fluid transmitting passageway means communicating with said high pressure zone and extending axially through and from one end of said body, aperture means communicating said passageway means with the interior of said poppet member, metering means disposed in said passageway means for restricting flow of pressurized fluid into the interior of said poppet member, said body having a pilot chamber disposed for communication with said passageway means and said low pressure zone, a resiliently biased pilot means disposed in said pilot valve chamber for controlling flow of pressurized fluid from said passageway means, said pilot valve means being adapted to open at a predetermined fluid pressure lower than a given system pressure at which said poppet member is adapted to open, whereby said poppet member is placed in a condition of floating equilibrium at said system pressure.

9. In a relief valve mechanism in accordance with claim 8, when said body includes a cylindrical-like stem projecting outwardly therefrom, said poppet member mounted for axial movement on said stem, said stem including a larger cylindrical portion adjacent the juncture of the stem with said body and a smaller cylindrical portion adjacent the distal end of said stem, and spaced sealing means coacting between said larger stem portion and the interior of said poppet member and between the latter and said smaller stem portion and sealing the interior of said poppet member against egress of fluid therefrom.

10. In a relief valve mechanism in accordance with claim 9, wherein said valve seat comprises a shell-like member open at one end and receiving said poppet member therein, and said poppet member having an exterior recessed portion adjacent the seating surface thereof, with said recessed portion being disposed in encompassed spaced relation by said skirt.

11. In a relief valve mechanism in accordance with claim 10, wherein said skirt comprises a symmetrically oblique surface diverging in the direction of opening of said member, and a radially projecting portion on said poppet member disposed in confronting relation to said oblique surface.

12. In a relief valve mechanism in accordance with claim 9, wherein the sealing area at said valve seat is less than the sealing area between said stem and the distal end of said poppet member for providing a fluid unbalancing force to supplement said resilient actuation of said pilot valve means.

13. In a relief valve mechanism in accordance with claim 8, wherein said metering means comprises a metering orifice having a metering pin therein for metering fluid through said orifice.

References Cited by the Examiner

UNITED STATES PATENTS

| | | | |
|---|---|---|---|
| 85,963 | 1/1869 | Richardson | 137—476 |
| 935,709 | 10/1909 | Turner | 137—469 |
| 2,431,769 | 12/1947 | Parker | 137—469 |
| 2,547,862 | 4/1951 | Gilmore | 137—478 |
| 2,873,760 | 2/1959 | Safford | 137—478 X |
| 3,164,166 | 1/1965 | Tennis | 137—491 |
| 3,212,523 | 10/1965 | Mortin | 137—491 X |

FOREIGN PATENTS 311,213  5/1929  Great Britain.

M. CARY NELSON, *Primary Examiner.*

W. JOHNSON, *Assistant Examiner.*